Patented Apr. 5, 1949

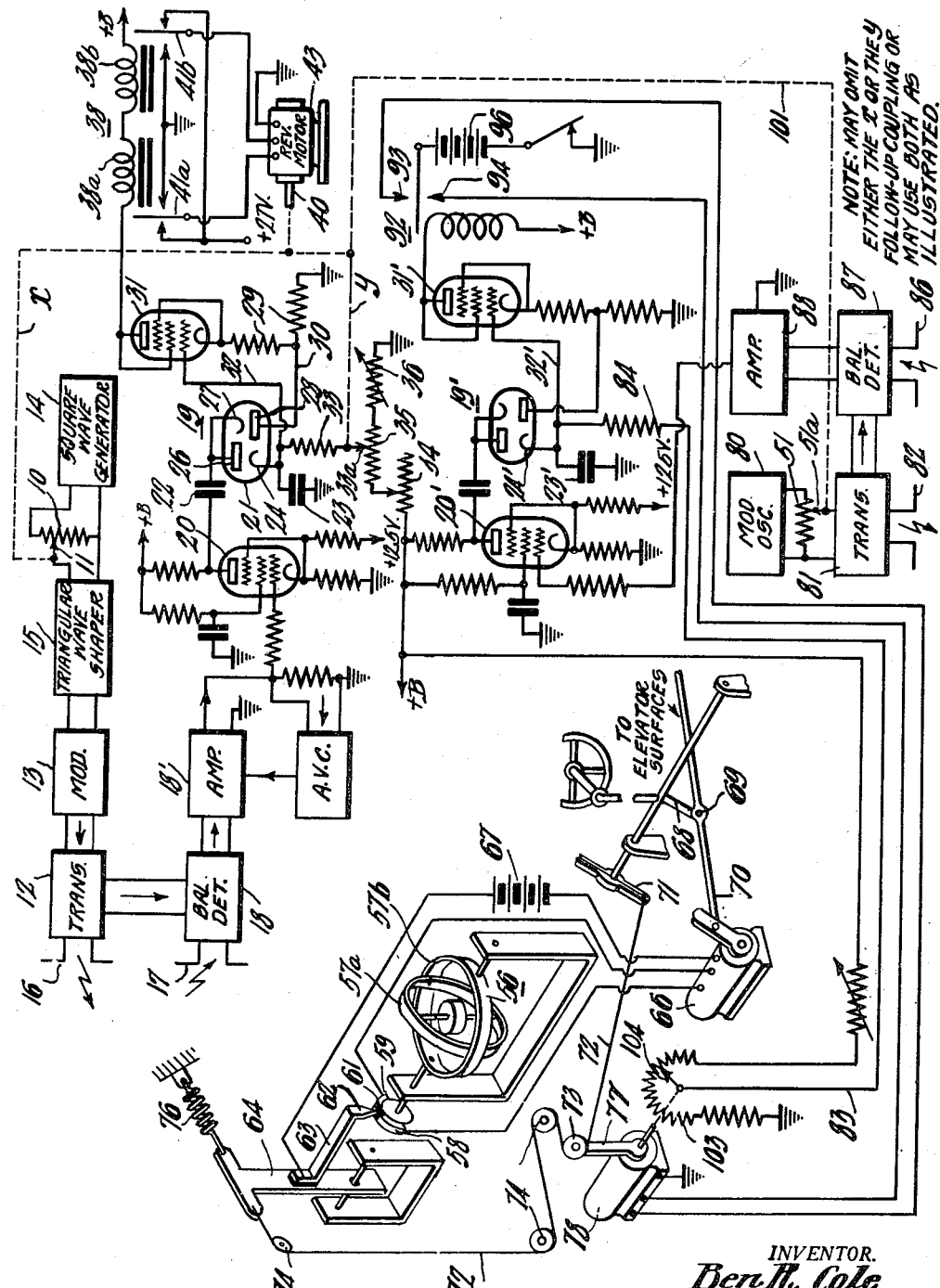

2,466,534

UNITED STATES PATENT OFFICE 2,466,534

RADAR GLIDE PATH CONTROL SYSTEM

Ben R. Cole, Princeton, N. J., assignor to Radio Corporation of America, a corporation of Delaware Application July 30, 1945, Serial No. 607,886

7 Claims. (Cl. 343—7)

My invention relates to the automatic control of an object in flight and particularly to the use of a reflected radio signal for directing a dirigible air-borne device such as an aircraft or aerial torpedo along a predetermined downward path toward and enemy ship or other target.

One object of the invention is to provide an improved method of and means for flying a bomb loaded dirigible air-borne device such as an aircraft or an aerial torpedo into a target.

Another object of the invention is to provide an improved method of and means for automatically directing an object in flight along a predetermined downward path toward a signal reflecting object.

According to a preferred embodiment of the invention the aircraft or flying torpedo is made to fly toward a target with a constant angle of approach. This may be accomplished by employing a radio altimeter for determining the altitude and by employing a radio distance determining system for determining the slant distance to the target. Altitude control means associated with the radio altimeter is provided for decreasing the altitude of the aircraft or torpedo in response to a decrease in the slant distance to the target.

The distance determining system may be similar to the radio altimeter and may include a motor that is controlled by the distance information, the motor being mechanically coupled through reduction gears to a movable divider tap of a follow-up circuit whereby the angular position of the reduction gear shaft (and the position of the movable tap) represent distance to the target. In the present invention, the reduction gear shaft, which is referred to as the "distance" shaft, is mechanically coupled to an adjustable element in the altimeter for changing the band width of the altimeter frequency modulation as a function of slant distance. In the example described, this adjustable element is a movable tap on an amplitude control potentiometer across which the frequency modulating signal for the altimeter appears.

The altimeter output controls a reversible motor that is mechanically coupled to the pitch or altitude control system, which preferably is of the type including a gyrostabilizer, whereby the aircraft is held at an altitude that is a function of the slant distance. A system comprising a radio altimeter and a gyrostabilizer system for controlling the altitude of an aircraft is described and claimed in a copending application Serial No. 484,458, now Patent No. 2,443,748, issued June 22, 1948, filed April 24, 1943 by Royden C. Sanders, Jr. and John H. Purl and entitled Aircraft control system.

The left-right control system (not illustrated) for making the aircraft or torpedo fly toward the target may be of the type wherein left-right directive antennas having overlapping radiation patterns are switched for radiating a frequency-modulated radio signal successively therefrom. Such a system is described and claimed in a copending application Serial No. 527,292, filed March 20, 1944, now Patent No. 2,459,457 which issued January 18, 1949 in the name of Royden C. Sanders, Jr. and entitled Comparator circuits for radio locators.

The invention will be better understood from the following description taken in connection with the accompanying drawing which shows a circuit and block diagram of one embodiment of the invention as applied to an aircraft or aerial torpedo.

Referring to the drawing, the invention is shown applied to an air-borne device such as an airplane, a drone, or a glider, which is controllable in flight. The invention will be described as applied to a drone (i. e., an aircraft operated by remote radio control) or flying torpedo that is to be flown with a bomb load into an enemy ship. Thus the aircraft is flown automatically along a glide path D into the target, the path D always being at a fixed angle $\theta$ to the earth's surface, or, if preferred, the angle $\theta$ may be made to change as the aircraft approaches the target. This is accomplished by making the elevation control of the aircraft responsive to apparatus that measures the slant distance from aircraft to target (the distance along glide path D) whereby the altitude H is reduced as the target is approached, so that $H = k_1 D + k_2$ where $k_1$ and $k_2$ are constants.

The apparatus for measuring the slant distance from the aircraft to the target and the apparatus for measuring altitude (the altimeter) are similar as will appear hereinafter. The slant distance measuring apparatus will first be described. It comprises a frequency-modulated radio transmitter unit that includes a radio transmitter 12, a frequency-modulating unit 13, a square wave generator 14 which supplies a square wave through an amplitude control potentiometer 10 to a wave shaping circuit 15 for producing a triangular wave whereby a linear frequency modulation of the transmitted radio wave is obtained. A suitable wave shaping circuit, for example is described and claimed in application Serial No. 512,153, filed November 29, 1943 in the name of Irving Wolff, now Patent No. 2,445,014, issued July 13, 1948, and entitled Vibratory mechanical system. The band width of the frequency-modulation sweep is determined by the setting of the tap 11 on the potentiometer 10 across which the square wave appears. The radio wave is radiated forwardly toward the target from a directional antenna 16 which may be of the Yagi type.

The frequency-modulated signal reflected from the target is received by a similar directive antenna 17 and supplied to a detector 18 where it heterodynes with frequency-modulated signal supplied directly from the transmitter 12 to produce a beat signal at audio frequency. Since the beat signal frequency depends upon the radio propagation time to the target, it is a measure of the slant distance. The beat signal is passed through an amplifier 18' to an amplitude limiter 20 and the resulting square wave signal is applied to a frequency counter 19.

The counter 19 comprises a pair of oppositely connected diodes in a common envelope 21 to which the square wave from the limiter 20 is applied through a capacitor 22 of comparatively small capacity. A storage capacitor 23 of comparatively large capacity has a charge supplied to it through the cathode 24 and anode 26 of one diode upon the occurrence of each positive half cycle of the square wave. Since the capacitor 22 is small enough to reach full charge during the first part of a square wave half cycle, the storage capacitor 23 is charged up a fixed additional amount each time a positive half cycle occurs whereby the voltage thereacross is proportional to the beat frequency, and, therefore, to distance. This voltage is applied to the grid of a vacuum tube 31 through a lead 32.

The diode which comprises a cathode 27 and an anode 28 is provided to discharge the capacitor 22 at the end of each positive half cycle to prevent it from blocking. The anode 28 is connected through a lead 30 to an intermediate point on a cathode bias resistor 29 of the vacuum tube 31 (rather than directly to the cathode of tube 31) to prevent current flow through the diode 27, 28 due to contact potential.

The storage capacitor 23 is provided with a leakage path through a resistor 33 that is connected by way of a variable tap 33a to a point on the divider 34, 35, 36. The voltage drop between ground and the tap 33a on the voltage divider provides a counter bias voltage on the cathode 24. The capacitor 23 will reach an equilibrium voltage for a given applied beat frequency, assuming the counter bias voltage and the resistance of the leakage path 33, 35, 36 are not changed. In certain embodiments of the present invention, the counter bias voltage, and to a minor extent, the leakage path resistance, are changed by means of the variable tap 33a which may be driven by a motor in accordance with slant distance information to provide a follow-up action as will be explained hereinafter.

The counter output voltage which is a function of slant distance is applied from capacitor 23 to the control grid of the amplifier tube 31 to control the amount of direct current flowing through the coils 38a and 38b of a marginal relay 38 in the anode circuit of the tube 31.

The relay 38 has armatures 41a and 41b connected to control a reversible motor 43. When the motor 43 rotates, it drives a slant distance shaft 40 through reduction gears (included in motor 43) and the shaft 40 moves the tap 33a along resistor 35 by means of a mechanical coupling indicated at y, thereby changing the bias voltage applied to the cathode side of the capacitor 23. As will be explained below, the motor 43 will rotate until the shaft 40 and the tap 33a assume a position corresponding to the slant distance from the aircraft to the target. As the aircraft approaches the target, the shaft 40, and the tap 33a coupled to it, will move continuously to indicate the slant distance continuously. As explained hereinafter, it is this "distance" shaft 40 that is utilized to change the band width of the frequency sweep of the altimeter to reduce the altitude of the aircraft as the target is approached.

In operation, as the aircraft approaches the target, the beat frequency output from the detector 18 decreases and the voltage across the counter storage capacitor 23 decreases so that its cathode side is less positive whereby the relay 38 is actuated to drive the motor in the direction for moving the tap 33a toward the ground end of resistor 35, thus decreasing the positive bias voltage applied to the cathode side of capacitor 23. If the beat frequency remained at some reduced frequency value, equilibrium would be reached and the motor 43 would stop. In the example assumed, the motor 43 will continue to move the tap 33a since the distance is being continually reduced. If the motor 43 moves the tap 33a too fast toward the ground end of resistor 35, the voltage across the storage capacitor 23 will start to decrease because of too little positive voltage applied through the resistor 33 and the motor 43 will be either stopped or reversed momentarily to make the necessary correction in the said positive bias voltage. It will be apparent that the angular position of the shaft 40 will indicate the slant distance to the target at all times.

The altitude control apparatus and the means by which it is controlled by the distance shaft 40 will now be described. Before describing this portion of the system in detail, attention is directed to the fact that the radio altimeter includes a potentiometer 51 having a tap 51a thereon that is driven by the distance shaft 40 for changing the band width of the frequency-modulation sweep of the altimeter. As will be apparent from the description that follows, the position of the tap 51a controls the altitude of the aicraft. As the distance shaft 40 rotates to an angular position representing less distance to the target, it moves the tap 51a to a position that reduces the altitude of the aircraft.

In the preferred embodiment of the invention, an automatic pilot mechanism of known construction is provided which is connected to the elevator control surfaces of the aircraft. The automatic pilot includes a longitudinal attitude control gyroscope 56 provided with gimbal rings 57a and 57b. Two conducting sectors 58 and 59 separated by a small insulating sector 61 rotate with the gimbal ring 57b. A contact element 62, engaging either the sector 61 or one of the conducting sectors 58 and 59, is on the end of an arm 63 that is mounted on a supporting member 64 and insulated therefom. The member 64 is pivotally supported so that the contact element 62 may be moved in an arcuate path about the sectors 58, 59 and 61. The sectors 58 and 59 are connected to a reversible motor 66, and the contact element 62 is connected through the lever 63 to one erminal of a D.-C. source 67, the other terminal of which is connected to the motor 66.

The shaft of the motor 66 is mechanically coupled through a linkage 70 to the elevator surfaces (not shown) of the aircraft.

The control stick 68 of the aircraft is connected at a pivot 69 to the control linkage, and through an arm 71 to a cable 72. The cable 72 is guided over a pulley 73 and a plurality of pulleys 74 and connected to the pivotally mounted supporting member 64. A spring 76 is provided to maintain the cable 72 under tension. The pulley 73 is supported at the end of a lever 77 secured to the shaft of a reversible follow-up motor 78.

Neglecting temporarily the effect of operating the motor 78, the operation of the gyro control system thus far described is as follows: The gyroscope 56 tends to maintain a constant attitude, with its rotor in a plane parallel to the surface of the earth. The movable contact element 62 normally engages the insulating sector 61. Any deviation of the aircraft from level flight will cause relative movement between the contact element 62 and the sectors 58, 61 and 59 and the element 62 will make contact with either the sector 58 or the sector 59. Thus the motor 66 will be energized so as to run in the proper direction to adjust the elevator control surfaces to cause the aircraft to resume its attitude for level flight.

In operating to adjust the control surface, the motor 66 also moves the cable 71, rotating the contact element 62 with respect to the longitudinal axis of the craft to provide a follow-up action. When the contact 62 reaches the insulated sector 61, the motor is deenergized. During this time the control surfaces have been bringing the aircraft back toward the position of level flight. As the airplane continues toward its normal attitude, the contact element 62, which has been displaced ahead of the gyroscope, passes the insulated sector and engages the opposite conducting sector, causing the motor 66 to run in the reverse direction. This returns the control surfaces toward the position for a level flight. Thus the applied control is removed as the aircraft is returning to its normal attitude, so that the control surface will be back in its neutral or central position when the disturbance has been corrected. It will be apparent that a follow-up action has been applied to control the aircraft's attitude as a function of the gyro control.

In order to maintain flight along the desired glide path D, a radio altimeter may be used to actuate the automatic pilot so that the attitude of the aircraft is changed for bringing it successively to the altitudes selected by the distance shaft 40, thus causing it to descend along the desired path. The altimeter is similar to the distance determining system previously described. In the altimeter circuit similar parts are identified by similar reference characters with a prime added.

The altimeter comprises a frequency-modulated transmitter 81 that radiates the signal downwardly from an antenna 82. The modulating wave, which may be triangular, for example, is supplied from a suitable source 80. The amplitude of the applied modulating wave may be adjusted by the movable tap 51a on the amplitude control potentiometer 51 for changing the band width of the frequency sweep, thereby determining the glide path as explained hereinafter. The reflected signal is received by an antenna 86 and supplied to a detector 87 where it beats with the frequency-modulated signal supplied directly from the transmitter 81 to produce an audio signal having a beat frequency that, for a given frequency-modulation band width, corresponds to the altitude H of the aircraft.

The beat frequency signal is supplied through an amplifier 88 and a limiter 20' to a frequency counter 19' which may be of the same type as the counter 19 previously described. The voltage appearing across the storage capacitor 23' of the counter 19' is applied through a lead 32' to the control grid of an amplifier tube 31'. The actuating coil of a relay 92 is connected in the anode circuit of the tube 31'. The relay 92 is provided with contacts 93 and 94 which are arranged to connect the motor 78 to a D.-C. source 96 for forward and reverse operation, respectively, and thus change the position of the contact element 62 of the gyro system by the action of the pulley 73 against the cable 72. Thus the altimeter output controls the attitude of the aircraft through the gyro system.

The desired ratio of slant distance to altitude, and thus the desired glide path, is maintained by mechanically coupling the distance shaft 40 to the band width control tap 51a of the altimeter as indicated by the broken line 101. As the aircraft approaches the target, the distance shaft 40 moves the tap 51a in the direction to increase the amplitude of the frequency-modulating wave and thereby increase the band width of the frequency modulation. Where a straight-line glide path is desired, this change in band width is linear with respect to slant distance, and the altimeter output is held substantially constant as the target is approached. Any departure from this constant output, ignoring for the moment the altimeter follow-up action described hereinafter, causes operation of the relay 92 so that the motor 78 operates to bring the aircraft back to the predetermined glide path.

The motor 78 also is coupled to the contact arm or variable tap 104 of a potentiometer 103 for changing the bias voltage on the counter 19' so that a follow-up action is provided for the altimeter control circuit. The bias voltage is applied from the tap 104 through a lead 83 and through a resistor 84 to the cathode 24'. The lever 77 and the potentiometer arm 104 are normally centered. When the aircraft departs from the selected level, the relay 92 operates to energize the motor 78 which now changes the position of the pulley 73. This moves the contact element 62 into contact with either the segment 58 or the segment 59 so that the motor 66 operates to change the flight attitude for bringing the aircraft to the selected level.

Motion of the motor 78 also moves the tap 104 of the potentiometer 103 whereby the bias voltage on the counter 19' is changed. As the aircraft moves toward the selected level, the relay 92 is operated due to the above-mentioned change in bias voltage to reverse the motor 78, thus returning the potentiometer tap 104 and the contact element 62 to their normally centered positions. The mechanical control ratios between the motor 78, the pulley 73 and the potentiometer arm 104 are such that the contact element 62 is centered when the craft reaches the selected altitude. This follow-up arrangement is necessary in order to prevent the aircraft from approaching the selected altitude in a climbing or diving attitude and overshooting the proper altitude.

Thus there has been described a system for automatically controlling the flight of a dirigible air-borne device along a predetermined descending path toward a signal reflecting object or target, and particularly a system for causing an aircraft or torpedo to home on and fly into or close to a target to bomb or torpedo it. It will be apparent that the invention may be employed in a blind landing system for aircraft, if desired.

In another embodiment of the invention the distance shaft 40 may be made to assume an angular position that is a function of slant distance by omitting the follow-up coupling $y$ to the bias tap 33a and substituting a follow-up coupling $x$ to the band width control tap 11. As the aircraft approaches the target and the slant distance decreases, the tap 11 is moved in the direction to increase the amplitude of the frequency-modulating wave and, therefore, to increase the band width of the frequency-modulation swing. As a result, the action of the follow-up coupling $x$ keeps the output of the counter 19 at a substantially constant value, any departure from said value causing the motor 43 to rotate in the proper direction to make the required correction. This embodiment has the advantage that the system has a greater tendency to "lock in" on a particular target as the aircraft approaches said target.

According to still another embodiment of the invention, the distance shaft 40 is coupled to both the bias control tap 33a and the band width control tap 11 through the mechanical couplings $y$ and $x$, respectively, whereby two follow-up circuits are provided. In order to avoid hunting or oscillation of the apparatus, one of these follow-up circuits preferably should have a slower time constant than the other.

Assuming that a straight line glide path is desired, the resistors 35 and 10 associated with the follow-up taps 33a and 11, respectively, should be non-linear so that the voltage at each of these taps is approximately $v = K\theta^{1/2}$ where K is a constant and $\theta$ is the angular position of the distance shaft 40.

The use of both follow-up circuits as described above may be desirable in order to obtain a system that operates at a maximum distance from the target and that maintains its control up to a minimum distance from the target.

I claim as my invention:

1. A control system carried by a dirigible air-borne device that is to travel along a predetermined glide path from said device to a signal reflecting object, said system comprising a frequency-modulated radio altimeter, means actuated by said altimeter to make said air-borne device go to an altitude corresponding to a selected band width of the frequency modulation of said altimeter, distance measuring means for obtaining an indication of the distance to said signal reflecting object, means for adjusting said band width, and means for so changing said band width adjustment of said altimeter in response to a change in said distance indication that said air-borne device travels along said glide path.

2. A control system for a dirigible air-borne device comprising gyrostabilizer means for controlling the attitude of said device, a frequency-modulated radio altimeter, means actuated by said altimeter for controlling said gyrostabilizer means to make said device go to an altitude corresponding to a selected band width of the frequency modulation of said altimeter, distance measuring means for obtaining an indication of the distance to a signal reflecting object, means for adjusting said band width, and means for changing said band width adjustment of the altimeter in response to a change in said distance indication for causing a decrease in said altitude as said distance decreases.

3. A control system for a dirigible air-borne device comprising a frequency-modulated radio altimeter, means actuated by said altimeter to make said device go to an altitude corresponding to a selected band width of the frequency modulation of said altimeter, means for adjusting said band width, distance measuring means for obtaining an indication of the distance to a signal reflecting object, and means including a follow-up circuit for said distance measuring means for changing said band width adjustment of said altimeter in response to a change in said distance indication for causing a decrease in said altitude as said distance decreases.

4. A control system installed in a dirigible air-borne device for guiding it downwardly toward a target, said system comprising a frequency-modulated radio distance measuring system which includes a frequency counter, a reversible motor, means for supplying said counter output to a control circuit for operating said motor, and means including a follow-up circuit for causing said motor to run in one direction or the other until the shaft of said motor assumes an angular position that is a predetermined function of said distance to the target, a frequency-modulated radio altimeter which includes a frequency counter for producing a second counter output, means responsive to the rotation of said motor for changing the frequency range through which said radio altimeter is frequency modulated and thereby changing the value of said altimeter counter output in the sense tending to keep it a constant value, a second reversible motor, means for driving said second motor in one direction or the other depending upon the magnitude of said altimeter counter output, and means for causing said air-borne device to go to a lower or higher altitude in response to operation of said second motor in the direction corresponding to an altitude measurement that is too large or too small, respectively.

5. A control system installed in a dirigible air-borne device for guiding it downwardly toward a target, said system comprising a frequency-modulated radio distance measuring system which includes a frequency counter having a bias voltage thereon, a reversible motor, means for supplying said counter output to a control circuit for operating said motor, said control circuit comprising means for reversing said motor in response to said counter output changing from one side of a predetermined value to the other side of said value, means for changing the value of said bias voltage as a function of the angular position of the shaft of said motor to provide a follow-up action, means for also changing the frequency range through which said distance measuring system is frequency modulated as a function of said angular position to provide a second follow-up action, a frequency-modulated radio altimeter which includes a frequency counter for producing a second counter output, means responsive to the rotation of said motor for changing the frequency range through which said radio altimeter is frequency modulated and thereby changing the value of said altimeter counter output in the sense tending to keep it a constant value, said altimeter including a follow-up circuit therefor which includes a second reversible motor, and means for causing said air-borne device to go to a lower or higher altitude in response to operation of said altimeter follow-up motor in the direction corresponding to an altitude measurement that is too large or too small, respectively.

6. The invention according to claim 5 wherein one of the follow-up circuits for said distance measuring system has a slower time constant than the time constant of the other follow-up circuit for said distance measuring system.

7. The invention according to claim 5 wherein means is provided to make said counter bias voltage in the distance measuring system and the frequency range of the frequency modulation of said distance measuring system each vary approximately as the square root of the angular position of the shaft of said motor in the distance measuring system.

BEN R. COLE.

REFERENCES CITED

The following references are of record in the file of this patent:

UNITED STATES PATENTS

| Number | Name | Date |
|---|---|---|
| 2,176,469 | Moueix | Oct. 17, 1939 |
| 2,201,174 | Harding | May 21, 1940 |
| 2,257,830 | Wolff | Oct. 7, 1941 |
| 2,268,587 | Guanella | Jan. 6, 1942 |
| 2,301,929 | Budenbom | Nov. 17, 1942 |
| 2,441,657 | Blitz | May 18, 1948 |